United States Patent Office 3,345,539
Patented Oct. 3, 1967

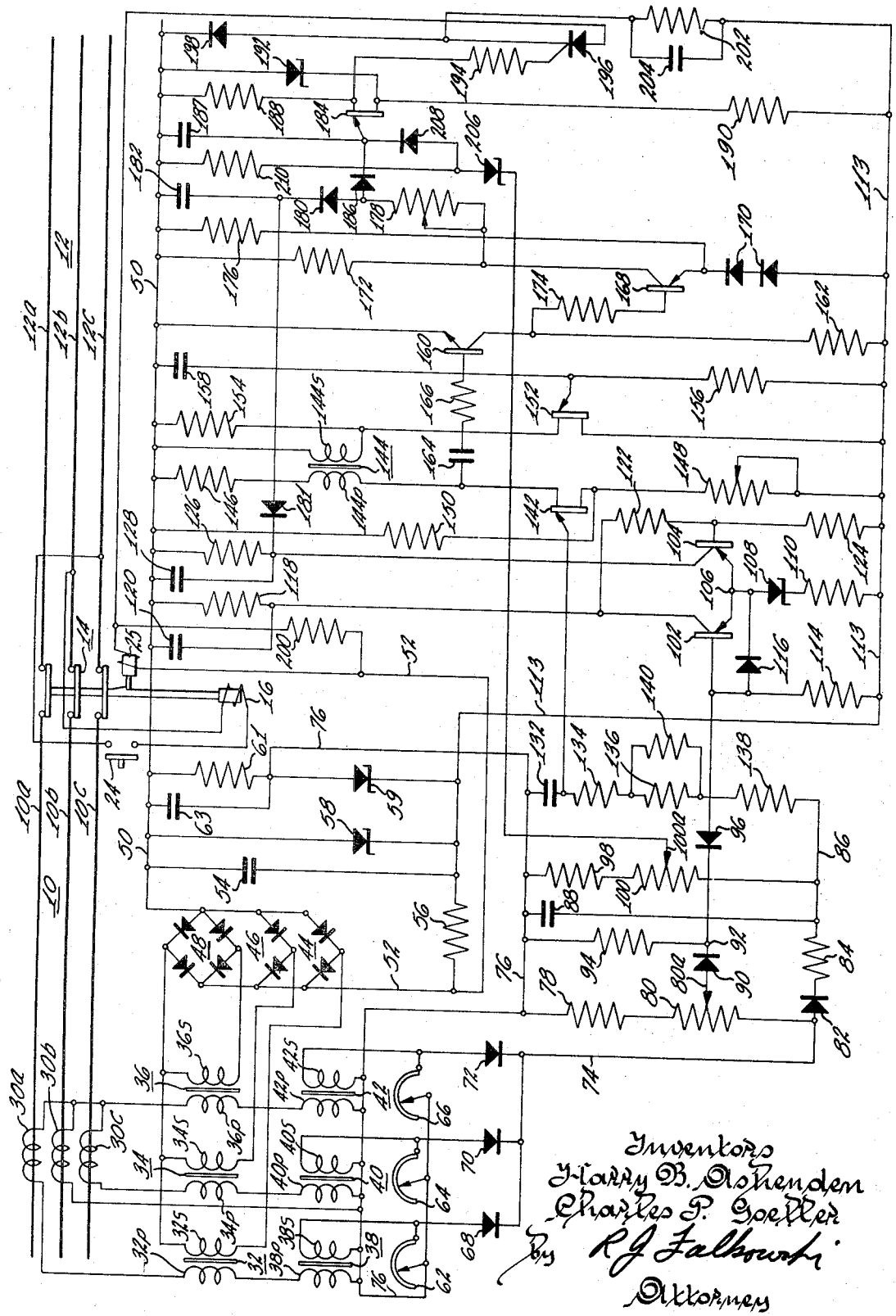

3,345,539
STATIC OVERCURRENT TRIPPING SYSTEM HAVING PHASE-TO-PHASE AND PHASE-TO-GROUND FAULT PROTECTION
Harry B. Ashenden, Hyde Park, and Charles P. Goeller, Quincy, Mass., assignors to Allis-Chalmers Manufacturing Company, Milwaukee, Wis.
Filed July 19, 1965, Ser. No. 472,893
7 Claims. (Cl. 317—33)

ABSTRACT OF THE DISCLOSURE

A three phase electrical power source is connected to a load through a circuit breaker. Current transformers are connected to be responsive to the currents in each of the phases and these current transformers are connected in a configuration with other transformers to supply power to the static control circuitry operating the circuit breaker and to provide a sensing signal indicating the current levels. The transformers providing the power and the sensing signals are connected in a manner wherein one of these transformers is connected between the common terminal of the current transformers and the ground to provide an indication of phase-to-ground currents in addition to an indication of phase-to-phase currents. The outputs from these transformers are received by the static control circuitry and when the level as measured by these circuits exceeds a selected level at a preselected time relationship the control circuitry operates to trip the circuit breaker.

---

This invention relates generally to means for tripping circuit breakers in response to fault conditions in the circuits protected. Particularly, this invention relates to such systems that employ static overcurrent sensing circuits responsive to current flow to trip the circuit breakers whenever a phase-to-phase or phase-to-ground fault occurs.

Prior to this invention, overcurrent sensing and tripping of low voltage power circuit breakers has usually been performed by electro-magnetic devices with series coils plus dash pots for time delay. These circuits have been considered somewhat adequate but they do not have the desired time characteristics or accuracy generally desired. Also, these devices are not capable of sensing the often encountered low magnitude ground faults. Generally they are incapable of operating until the ground fault develops into one of such a great magnitude that equipment on the line can be and often is damaged. In addition, these circuits require a separate power source to supply energy for the relays and for tripping and require a significant amount of space, and are relatively expensive.

One of the advantages of a system according to this invention is that, in addition to providing phase-to-phase fault protection, the system also provides phase-to-ground fault protection. It provides this fault protection at levels lower than could previously be sensed to trip the circuit breaker in the event of a ground fault. In addition, a single power source derived from the protected circuit is used to provide tripping power, power for the operation of the protective system, and the intelligence signal for the system.

The objects of this invention are: to provide a new and improved circuit protection system; to provide a new and improved static relay system capable of sensing phase-to-phase and phase-to-ground faults of relatively low magnitude; to provide a circuit protection system that produces an output signal when a preselected phase-to-phase or a pre-selected phase-to-ground fault occurs in the protected system; to provide a static relay sensing system for tripping a circuit breaker in the event of a phase-to-phase or phase-to-ground fault that utilizes a single power source derived from current transformers connected in the protected line to sense the current in the protected systems and to provide power for operation of the circuit breaker and relay; to provide a relatively low cost protection system for protecting power circuits from incipient ground faults as well as phase-to-phase overcurrents; to provide overcurrent tripping devices that sense low magnitude ground faults as well as overcurrents; to provide a system that can be completely self-contained within the circuit breaker structure; and to provide an overcurrent responsive device that senses low magnitude ground faults while retaining desirable characteristics for static overcurrent tripping levels.

Other objects and advantages will appear from the following detailed description of an embodiment of the invention.

In accordance with the invention and the embodiment of the invention disclosed herein, current transformers are connected in the lines of a three-phase system to provide a measure of the current through each of the phases. Means are provided for sensing this measure of the current to sense any significant unbalance between the phases and to sense the occurrence of a relatively low magnitude phase-to-ground fault. The current supplied by the current transformers connected in the lines is used to provide power for the operation of a static relay system and a circuit breaker and to provide an intelligence signal to the static relay for determining when an overcurrent condition exists.

The figure is an illustration of an embodiment of this invention.

Referring to the embodiment of the invention shown in the figure, the numeral 10 designates a protected circuit such as a three phase alternating current circuit having phase conductors 10a, 10b and 10c. Protected circuit 10 is connected to an associated circuit 12, having conductors 12a, 12b and 12c, that supplies power through circuit interrupting means such as a circuit breaker 14 having contacts for interrupting current through each of the phase conductors 10a, 10b and 10c. In the event of a selected overcurrent fault between phases or between a phase and ground in circuit 10, circuit breaker 14 is operated to isolate circuit 10 from circuit 12.

Circuit breaker 14 is a latched closed circuit breaker and is provided with closing or reclosing means such as a solenoid 16 that effects closure of the contacts when energized. Solenoid 16 is connected on one side to phase conductor 12b and on its other side to phase conductor 12c through a normally open reset switch 24. If circuit breaker 14 is tripped open, momentary closure of reset switch 24 effects energization of solenoid 16 and reclosure of contacts 14a, 14b and 14c of the circuit breaker.

Circuit breaker 14 is also provided with tripping means. The figure shows the tripping means to comprise a normally deenergized tripping solenoid 25 that effects tripping of circuit breaker 14 when energized. Solenoid 25 is connected to the static overcurrent tripping device as hereinafter explained and is adapted to be controlled thereby to trip circuit breaker 14. If preferred, a flux shifting magnetic latch release which uses less power may be used instead of tripping solenoid 25. In a flux shifting magnetic latch release a spring loaded armature is normally held in position by flux from a permanent magnet. Energization of its coil causes a shift in the flux to release the armature and trip the circuit breaker.

Three current transformers having secondary windings 30a, 30b and 30c are each associated with phase conductors 10a, 10b and 10c, respectively. The current transformers are preferably of the bushing type and are associated with the studs of circuit breaker 14. The current transformers provide a small secondary current that is proportional to the current in the phase conductors. This secondary current ultimately provides the energy for the circuitry in the static relay and for tripping solenoid 25 and also provides the intelligence for the static relay hereinafter described.

Secondary windings 30a, 30b and 30c of the current transformers are connected in Y. The common terminals of the secondary windings of the current transformers are connected to a common conductor 76 through a primary winding 36p of a current transformer 36 and a primary winding 42p of a current transformer 42. The other terminal of secondary winding 30a is connected to common conductor 76 through the series connected circuit made up of a primary winding 32p of a current transformer 32 and a primary winding 38p of a current transformer 38. The other terminal of secondary winding 30b is connected directly to common conductor 76. The other terminal of secondary winding 30c is connected to common conductor 76 through the series connected circuit made up of a primary winding 34p of a current transformer 34 and a primary winding 40p of a current transformer 40. Current transformers 30a, 30b and 30c produce a small secondary current proportional to the primary current through each of the lines 10a, 10b and 10c.

With this manner of connecting, it is possible to discriminate between a phase fault and a ground fault. A phase-to-phase fault causes equal and opposite currents to flow in the two current transformers, of 30a, 30b and 30c, involved and the low impedance path for this current is then out of one transformer winding and back through the other. With a phase-to-phase fault very little, if any, current returns through the neutral connection and transformers 36 and 42 do not sense the condition. If there is no phase-to-phase fault and the loads of all three phases are reasonably well balanced, there is an approximately equal current in all three current transformers 30a, 30b and 30c. Since these currents are 120° apart in phase, they will add vectorially to zero at the common conductor 76 and very little residual current flows through transformers 36 and 42. These transformers, therefore, do not sense load current.

However, a phase-to-phase fault between any of the conductors 10a, 10b or 10c causes current to flow through transformers 32 and 38 or transformers 34 and 40. This increased current, which provides power for the operation of the circuit, also appears across rheostats 62 and 64 to provide the output that is sensed as hereinafter explained. This current flows only when a phase-to-phase fault condition occurs.

A phase-to-ground fault produces a current in only one current transformer, 30a, 30b or 30c, which must flow through the neutral or common connections because the only other paths through the other current transformers, 30a, 30b or 30c, have very high impedance. Transformers 36 and 42 therefore sense such faults and produce an output at their secondary windings.

If the loads are balanced, it is possible to set the device to operate on ground fault clearance of much lower magnitude than the magnitude of the expected load current without danger of undesired operation because of load currents. By selecting the characteristics of the current transformers 32, 34, 36, 38, 40, and 42, any of transformers 32, 34, 38, or 40 can be matched to the current appearing at the output of transformers 36 and 42 even though the primary currents are usually of different magnitudes. Therefore, the level of response can be selected separately for either phase-to-phase or phase-to-ground faults.

The electrical power for the circuit breaker is taken from transformers 32, 34, and 36, which also provide electrical power for the operation of the static relay device. To provide for sufficient current upon a ground current condition, the ratios of transformers 36 and 42 are different from the ratios of transformers 32, 34, 38, and 40. The ratios of transformers 36 and 42 are selected to provide the same output level from their secondaries at relatively low magnitude of current in the common or neutral transformer connection as transformers 32, 34, 38, and 40 provide at much higher currents in the phases. In order to obtain enough current and voltage from the power supply to operate the trip mechanism of the breaker at the low magnitudes of ground fault current, transformer 36 must be sufficient to step up the current to the required magnitude for tripping. To accomplish this, the voltage across primary winding 36p at low currents must be relatively high, that is, the transformer must act as a relatively high impedance in the common or neutral lead of current transformers 30a, 30b and 30c. Therefore, the minimum magnitude of fault current at which dependable operation can be obtained depends on the voltage that the related current transformer can induce without saturating. The practical limit for this is principally the space available for the transformer.

Secondary windings 32s, 34s, and 36s of power supply transformers 32, 34, and 36, respectively, are connected to the input terminals of bridge rectifiers 44, 46, and 48, respectively, to provide a supply of rectified low voltage power between a conductor 50 and a conductor 52 for operation of tripping solenoid 25 and for operation of the various circuits and components of the static relay. This supply of rectified low voltage power is filtered by a filter capacitor 54 connected in series with a resistor 56 between conductors 50 and 52, A Zener diode 58 is connected across filter capacitor 54 to regulate the power supply voltage. A network comprising a Zener diode 59 and a resistor 61 connected in series is connected in parallel with Zener diode 58. A capacitor 63 is connected across resistor 61. One side of solenoid 25 is connected to conductor 52 and the other side of the solenoid is connected as hereinafter explained.

Rheostats 62, 64 and 66 are connected in parallel with secondary windings 38s, 40s and 42s, respectively, of auxiliary transformers 38, 40 and 42, respectively. The auxiliary transformers provide small AC signal currents. These signal currents flow through the rheostats and produce AC signal voltages that are proportional to the currents in the associated secondary windings of auxiliary transformers 38, 40 and 42. The rheostats afford means for regulating these AC signal voltages to provide a pickup adjustment for selecting the minimum current at which the static relay will operate to eventually trip the circuit breaker. Rheostats 62, 64 and 66 are connected through rectifiers 68, 70, and 72, respectively, to a conductor 74. Thus, a signal appears between conductors 74 and 76 to serve as the intelligence input signal for the static overcurrent trip device.

A voltage dividing network comprising a resistor 78 and a potentiometer 80, having a tap 80a, connected in series is connected across conductors 76 and 74. Potentiometer 80 serves as means of adjusting the signal voltage at which the trigger circuit operates and is adjustable at the factory to allow for tolerances in commercial components. Tap 80a of potentiometer 80 is adjustable to operate a trigger circuit, hereinafter described, and to thereby start a timing function at some desired level of voltage. The trigger circuit is a form of the well known Schmitt trigger circuit.

A circuit is provided for rectifying and filtering the AC signal voltage and comprises a diode 82 and a resistor 84 connected in series with each other between conductor 74 and a conductor 86. A capacitor 88 is connected between conductors 76 and 86 and the voltage across the capacitor is proportional to the current in secondary windings 38s, 40s, and 42s of current transformers 38, 40 and 42. Resistor 84 and capacitor 88 comprise a peak filter since the signal voltage at conductor 86 is very close to the peak value of the AC signal voltage. The static relay responds to the highest value of current in any one of the secondary windings 38s, 40s or 42s. The rectifying and filtering circuit further comprises a diode 90 connected between tap 80a of potentiometer 80 a point 92. A resistor 94 is connected between conductor 76 and point 92. A diode 96 is connected between point 92 and the base of a transistor 102 hereinafter described.

Diode 82 prevents discharge of capacitor 88 through tap 80a of potentiometer 80 and resistor 78 during alternate half cycles. Rectifiers 68, 70 and 72 are half wave rectifiers and that consequently pulsating direct current appears at diode 82.

Diode 90 is provided to cause the base current of transistor 102 to flow through resistor 94 only, rather than partly through potentiometer 80 and resistor 78.

A voltage dividing network comprising a resistor 98 and a potentiometer 100 connected in series is connected between conductors 76 and 86. A tap 100a of potentiometer 100 is connected as hereinafter explained. Potentiometer 100, which is connected across the signal circuit, is part of an instantaneous tripping circuit and is adjustable to set the current point at which tripping solenoid 25 becomes energized to trip circuit breaker 14 instantaneously.

The trigger circuit, hereinbefore referred to, is provided to prevent a timing circuit, hereinafter described, from operating and thus to prevent breaker 14 from tripping when the signal voltage is below some predetermined value which is the minimum at which it is desired to have the circuit respond. The trigger circuit comprises transistor 102 and a transistor 104.

The base of transistor 102 is connected to diode 96. The emitters of transistors 102 and 104, respectively, are connected to a common point 106 as is characteristic of the Schmitt trigger circuit. A Zener diode 108 and a temperature compensating resistor 110 are connected in series with each other between point 106 and a conductor 113 that is connected to conductor 52 through resistor 56. Temperature compensating resistor 110 prevents variation in the pickup point. A temperature compensating resistor 114 is connected between the base of transistor 102 and conductor 113. A diode 116 is connected between the base of transistor 102 and point 106. A resistor 118 is connected between the collector of transistor 102 and conductor 50. A capacitor 120 is connected across resistor 118.

A voltage divider network is provided that comprises a resistor 122 and a resistor 124 connected in series with each other between conductor 113 and the collector of transistor 102. The base of transistor 104 is connected to a point between resistors 122 and 124. A resistor 126 is connected between the collector of transistor 104 and conductor 50. A capacitor 128 is connected across resistor 126.

If the signal voltage to the base of transistor 102 is below a predetermined value, transistor 102 is biased "on" and the timing circuit does not function. Consequently, tripping solenoid 25 is not energized. However, if the signal voltage exceeds a predetermined value, transistor 102 is biased "off" and transistor 104 is biased "on." When transistor 104 is biased "on," a voltage appears across capacitor 128 and resistor 126 that blocks current from a capacitor 182, hereinafter described, and the latter can then be charged to cause triping solenoid 25 to eventually trip circuit breaker 14, as hereinafter explained.

If at any time while the static relay is timing out, the signal voltage to the base of transistor 102 decreases below the minimum value for which the static relay is set to cause tripping, diode 96 ceases to block the base current to transistor 102 and the latter is biased "on." In this event, transistor 104 is biased to "off" and capacitor 182 then discharges through a diode 181 and resistor 126. The static relay is thus reset and does not function again until the signal voltage again increases above the minimum pickup point.

A nonlinear resistance network is connected in series with a capacitor 132 between conductors 86 and 76 and comprises resistors 134, 136, and 138 connected in series with each other. A resistor 140 is connected in parallel with resistor 136. Capacitor 132 is part of a pulse generating circuit and is charged by steady D.C. current.

The pulse generating circuit is provided to afford a source of pulses having a repetition rate related to the signal voltage. The relationship between the pulse repetition rate and the signal voltage can be varied between wide limits by changes in the resistance values in the nonlinear resistance network. For example, the pulse repetition rate may be varied approximately as the square of the primary current. However, other relationships could be provided for. The pulse generating circuit comprises a unijunction transistor 142 having an emitter connected to a point between capacitor 132 and resistor 134 of the nonlinear resistance network. A transformer 144 has one end of its primary winding 144b connected to conductor 50 through a resistor 146. A voltage dividing network comprising a potentiometer 148 and a resistor 150 in series therewith is connected between conductors 113 and 50. Base two of unijunction transistor 142 is connected to a point between potentiometer 148 and resistor 150. Potentiometer 148 is adjustable to vary the base to base voltage of transistor 142 and consequently the peak point emitter voltage at which transistor 142 fires to discharge capacitor 132 and thereby create a pulse. This is a factory adjustment provided to allow for tolerances in commercial components.

The pulse generating circuit operates as follows. When a signal voltage appears across conductors 76 and 86, current flows through the nonlinear resistance network and capacitor 132 gradually charges to a voltage which exceeds the peak point voltage of unijunction transistor 142. Unijunction transistor 142 then fires and discharges capacitor 132 through primary winding 144p of transformer 144 and resistor 146 thereby creating a small pulse. Capacitor 132 then immediately charges and discharges again and continues to repeat this process until tripping solenoid 25 is energized and circuit breaker 14 trips, or until the signal voltage decreases to a sufficiently low value so that tripping is not required.

It is desirable that unijunction transistor 142 be able to fire at a very low current, i.e., at a much lower current than it would otherwise be when energized from capacitor 132 when the latter is being charged by a very small charging current. This feature is desirable in order to cover the wide range of time delays provided for by the static relay shown in the figure particularly when starting with a very small charging current on capacitor 132 at the minimum pickup value of the signal. Accordingly, there is provided a unijunction transistor 152 that has its base one connected through secondary winding 144s of transformer 144 to conductor 50. A resistor 154 is connected across secondary winding 144s of transformer 144. A resistor 156 is connected in series with a capacitor 158 between conductors 113 and 50 and the emitter of unijunction transistor 152 is connected to a point between resistor 156 and capacitor 158. Unijunction transistor 152 generates small pulses at a constant rate of repetition that are fed through transformer 144 and periodically reduce the base to base voltage of unijunction transistor 142.

A voltage amplifier circuit is provided to amplify the pulses from unijunction transistor 142. This circuit comprises a transistor 160. The emitter of transistor 160 is connected to conductor 50 and the collector is connected through a resistor 162 to conductor 113. A capacitor 164 is connected in series with a resistor 166 between the base of transistor 160 and a point between primary winding 144p of transformer 144 and base one of unijunction transistor 142. The voltage amplifier circuit further comprises a transistor 168. The emitter of transistor 168 is connected through a pair of series connected rectifiers 170 to conductor 113. The collector of transistor 168 is connected through a resistor 172 to conductor 50. The base of transistor 168 is connected through a resistor 174 to the collector of transistor 160. A resistor 176 is connected between conductor 50 and the emitter of transistor 168.

When a pulse of current occurs in primary winding 144p of transformer 144 and resistor 146, a corresponding pulse of current is driven through capacitor 164 and resistor 166 to the base of transistor 160 to turn the latter "on" momentarily. This in turn causes a pulse of current to be driven through resistor 174 to the base of transistor 168 to turn the latter "on" momentarily. This effectively amplifies the relatively low voltage pulse which appears at transformer 144.

A potentiometer 178, a diode 180, and capacitor 182 are connected in series with each other between conductor 50 and the collector of transistor 168. Diode 181 is connected between a point between diode 180 and capacitor 182 and the collector of transistor 104. A portion of the pulses generated by transistor 168 go through potentiometer 178 and rectifier 180 to charge capacitor 182 gradually. The time required to charge capacitor 182 depends on the pulse repetition rate and the setting of potentiometer 178. If potentiometer 178 is set to provide high resistance, less energy per pulse goes into capacitor 182.

The switching circuit comprises a unijunction transistor 184 that has its emitter connected through a diode 186 to a point between potentiometer 178 and diode 180. The emitter of unijunction transistor 184 is also connected through a capacitor 187 to conductor 50. Base one of unijunction transistor 184 is connected through a resistor 188 to conductor 50 and base two is connected through a resistor 190 to conductor 113. Base two of unijunction transistor 184 is also connected through a Zener diode 192 to conductor 50. Base one of unijunction transistor 184 is also connected through a resistor 194 to the gate of a silicon controlled rectifier 196. The cathode of silicon controlled rectifier 196 is connected through a diode 198 to conductor 50. The anode of silicon controlled rectifier 196 is connected to the other side of tripping solenoid 25. A resistor 200 is connected in parallel with tripping solenoid 25. A resistor 202 is connected between the cathode of silicon controlled rectifier 196 and conductor 113. A capacitor 204 is connected in parallel across resistor 202.

When capacitor 182 is eventually charged by pulses to a voltage which closely approaches the peak point voltage of unijunction transistor 184, the next pulse then fires the unijunction transistor to cause a voltage pulse to appear across resistor 188. This voltage pulse is applied to the gate of silicon controlled rectifier 196 and causes the latter to turn "on." With silicon controlled rectifier 196 "on," tripping solenoid 25 is energized thereby causing circuit breaker 14 to trip open. When circuit breaker 14 opens, current transformers 30a, 30b and 30c are deenergized and the static relay resets itself.

Note that capacitor 182 is blocked by diode 180. The portion of the pulse generated by transistor 168 which appears across resistor 188 when unijunction transistor 184 fires is usually sufficient to cause controlled rectifier 196 to fire. However, the current required to fire a component such as rectifier 196 may vary due to manufacturing tolerances of the latter. Therefore, capacitor 187, which is understood to be relatively small compared to capacitor 182, is provided as a safety factor in the event that the pulse across resistor 188 is not sufficient. When transistor 184 fires, capacitor 187 discharges through it to create a pulse which is always sufficient to turn controlled rectifier 196.

Referring again to potentiometer 100 which is part of the instantaneous trip circuit, it is seen that its tap 100a is connected through a Zener diode 206 and a diode 208 to the emitter of unijunction transistor 184. A resistor 210 is connected between conductor 50 and a point between Zener diode 206 and diode 208. If potentiometer 100 is set for instantaneous trip, a predetermined signal voltage therefrom causes unijunction transistor 184 to fire instantaneously to effect operation of solenoid 25 and tripping of circuit breaker 14, as hereinbefore described.

The apparatus shown operates as follows: assume that circuit breaker 14 is closed and that tripping solenoid 25 is deenergized. Further, assume that the static relay is adjusted so that instantaneous trip will not occur. Assume that phase-to-phase or phase-to-ground fault appears in circuit 10 and that the current transformers, the power transformers and the auxiliary transformers are responding thereto. The static relay is thus being provided with power for its operation and with intelligence information and that tripping solenoid 25 is in readiness to be energized from this same supply of power. Further, assume that potentiometer 80 has been adjusted to operate the trigger circuit and start the timing at some predetermined voltage. As long as the voltage is below the predetermined value, transistor 102 is biased "on" and transistor 104 is biased "off." As soon as the voltage exceeds the predetermined value, transistor 102 turns "off" and transistor 104 turns "on." With transistor 104 "on," a voltage appears across capacitor 128 and resistor 126 which blocks the flow of current from capacitor 182. Capacitor 182 is now in readiness to be charged by the pulse generator. Current flow through the nonlinear resistance network referred to hereinbefore, causes capacitor 132 to charge. When capacitor 132 is gradually charged to a voltage which exceeds the peak voltage of unijunction transistor 142, the latter fires and discharges capacitor 132 through transformer 144 and resistor 146 creating a small pulse. Capacitor 132 continues to charge and discharge until the circuit breaker trips or the primary current decreases to a value which is sufficiently low that tripping is not required. The pulse across transformer 144 and resistor 146 drives a pulse of current through capacitor 164 to the base of transistor 160 to turn the latter "on" momentarily and provides a pulse at much higher voltage that causes capacitor 182 to charge. Repetition of this pulsation gradually charges capacitor 182 to a voltage which exceeds the peak point of voltage of unijunction transistor 184. The next pulse will then fire unijunction transistor 184 to create a pulse of voltage which turns "on" controlled rectifier 196. When the latter is turned "on," tripping solenoid 25 becomes energized and circuit breaker 14 trips. When circuit breaker 14 trips current transformers 30 are deenergized. Consequently, blocking voltage across resistor 126 and capacitor 128 disappears and capacitor 182 discharges immediately through diode 181 and resistor 126. The static relay is then reset and ready to again provide full time delay should a fault still exist when the circuit breaker is reclosed.

In describing the invention, the preferred embodiment has been shown and described, but it is obvious to one skilled in the art that there are many variations, combinations, alterations and modifications that may be made without departing from the spirit of the invention, or from the scope of the appended claims.

The embodiments of the invention in which an exclusive property or privilege is claimed are defined as follows:

1. A control system for a circuit breaker protecting a polyphase electrical power circuit comprising:
   first means associated with each phase for providing a current output proportional to the current in each phase;
   second means responsive to the current output for providing a first signal output varying as a function of the difference in current between any of the phases and a second signal output varying as a function of current between any one of the phases and ground, said second means providing a substantially higher second signal output for a given current between a phase and ground as compared to the first signal output for the same given current output between any of the phases; and
   static relay means responsive to the signal outputs for opening the circuit breaker when one of said output signals exceeds a preselected level for a preselected time.

2. A control system for a circuit breaker protecting a polyphase electrical power circuit comprising:
   a primary current transforming means for each phase with each means electrically associated with a different phase of the power circuit to each provide an output current proportional to the current in its associated phase, each of said primary current transforming means having a first and second output terminal with the second terminals connected to each other in a common connection and with the first output terminal of one of the primary current transforming means connected to a common ground connection;
   power supply current transforming means and auxiliary current transforming means each separately associated with a respective primary transforming means and each having an input circuit and an output circuit, said power supply and auxiliary transforming means arranged to form sensing circuits with each sensing circuit comprising the input circuit of a power supply transforming means and of an auxiliary transforming means connected in series with one of said sensing circuits connected between the first output terminal of one of the primary transforming means and the common ground connection, and another of said sensing circuits connected between the commonly connected second terminals of the primary transforming means and the common ground connection to provide a control output at the output circuit of the auxiliary transforming means; and
   static relay means responsive to the control output for producing a signal to trip the circuit breaker when the control output exceeds a preselected level for a preselected time.

3. A control system for a circuit breaker protecting a three phase electrical power circuit comprising:
   a first, second, and third primary current transformer each electrically associated with a different phase of the power circuit for providing an output current proportional to the current in its associated phase, each of said primary current transformers having a first and second output terminal with the second output terminals connected to each other at a common connection and the first output terminal of the second primary current transformer connected to a common ground connection;
   three power supply current transformers and three auxiliary current transformers each having primary and secondary windings, said power supply and auxiliary transformers arranged to form a first, second, and third circuit each comprising a primary winding of a power supply transformer and of an auxiliary transformer connected in series, said first circuit connected between the first output terminal of the first primary transformer and the common ground connection, said second circuit connected between the first output terminal of the third primary transformer and the common ground connection, and said third circuit connected between the commonly connected second terminals of the primary transformers and the common ground connection; and
   static relay means responsive to the output of the secondary windings of the auxiliary transformers for producing a signal to trip the circuit breaker when the current through any one of the auxiliary transformers exceeds a preselected level for a preselected time.

4. A control system for a circuit breaker protecting a three phase electrical power circuit comprising:
   a first, second, and third primary current transformer each electrically associated with a different phase of the power circuit to each provide an output current proportional to the current in its associated phase, each of said primary current transformers having a first and second output terminal with the second terminals connected to each other at a common connection thereby creating a Y configuration and the first output terminal of the second primary current transformer connected to a common ground connection;
   three power supply current transformers and three auxiliary current transformers each having primary and secondary windings, said power supply and auxiliary transformers arranged to form a first, second, and third circuit each comprising a primary winding of a power supply transformer and of an auxiliary transformer connected in series, said first circuit connected between the first output terminal of the first primary transformer and the common ground connection, said second circuit connected between the first output terminal of the third primary transformer and the common ground connection, and said third circuit connected between the commonly connected second terminals of the primary transformers and the common ground connection, said transformers in said third circuit selected to have substantially higher output ratios as compared to the output ratios of the transformers in the first and second circuits;
   static relay means responsive to the output of the secondary windings of the auxiliary transformers for producing a signal to trip the circuit breaker when said auxiliary transformer outputs exceed a preselected level for a predetermined time, said relay means comprising means for resetting when said auxiliary transformer outputs drop below a preselected level for a preselected time; and
   means responsive to the output of the secondary windings of the power supply transformer for providing electrical energy for operation of the static relay means and the circuit breaker.

5. A control system according to claim 1 also comprising means responsive to the current outputs for providing electrical power for the operation of the static relay means and the circuit breaker.

6. A control system according to claim 2 comprising means responsive to the output at the output circuit of the power supply transforming means for providing electrical energy for operation of the static relay means and the circuit breaker.

7. A control system according to claim 3 also comprising means responsive to the output of the secondary windings of the power supply transformers for providing electrical energy for operation of the static relay means and the circuit breaker.

References Cited
UNITED STATES PATENTS
3,262,017  7/1966  Ashenden et al. _____ 317—33

MILTON O. HIRSHFIELD, *Primary Examiner.*

J. D. TRAMMELL, *Assistant Examiner.*